(12) United States Patent
Collins

(10) Patent No.: US 11,035,717 B2
(45) Date of Patent: Jun. 15, 2021

(54) VEHICLE WEIGHING SCALE LIFTING BRACKET

(71) Applicant: Toyota Motor Engineering & Manufacturing North America, Inc., Plano, TX (US)

(72) Inventor: Jeffrey M. Collins, Davisburg, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 21 days.

(21) Appl. No.: 16/573,455

(22) Filed: Sep. 17, 2019

(65) Prior Publication Data

US 2021/0080315 A1  Mar. 18, 2021

(51) Int. Cl.
*G01G 19/02* (2006.01)
*G01G 23/00* (2006.01)

(52) U.S. Cl.
CPC ............ *G01G 19/02* (2013.01); *G01G 23/00* (2013.01)

(58) Field of Classification Search
CPC ....... G01G 19/02; G01G 19/083; G01G 23/00
See application file for complete search history.

(56) References Cited

U.S. PATENT DOCUMENTS

| 4,491,190 A * | 1/1985 | Mayfield ................ G01G 19/10 177/139 |
| 6,124,554 A * | 9/2000 | Muckle ................ G01G 19/083 177/126 |
| 6,315,079 B1 * | 11/2001 | Berends .................... B66F 3/46 187/203 |
| 6,600,111 B2 * | 7/2003 | Simons ................ G01G 19/083 177/139 |
| 9,174,831 B2 * | 11/2015 | Rothkegel .............. G01G 3/141 |
| 9,290,369 B2 * | 3/2016 | De Jong ................... B66F 3/46 |
| 10,107,673 B2 * | 10/2018 | Liang .................. G01G 3/1402 |
| 2003/0234122 A1 * | 12/2003 | Kroll .................... G01G 19/083 177/146 |

OTHER PUBLICATIONS

Portable Weighing Scale found at: https://www.electronicweighscale.com/portable-weigh-pads.html (accessed on Sep. 17, 2019).
Portable Weighing Scale found at: https://www.phoenixvehicleweighing.co.uk/pvwam-portable-axle-weigh-pads/ (accessed on Sep. 17, 2019).

* cited by examiner

*Primary Examiner* — Natalie Huls
(74) *Attorney, Agent, or Firm* — Christopher G. Darrow; Darrow Mustafa PC

(57) ABSTRACT

A lifting bracket for a vehicle weighing scale includes a first lifting portion having a first wall, a second wall extending from the first wall, and a third wall coupled to the second wall. The third wall extends opposite and spaced apart from the second wall.

7 Claims, 2 Drawing Sheets

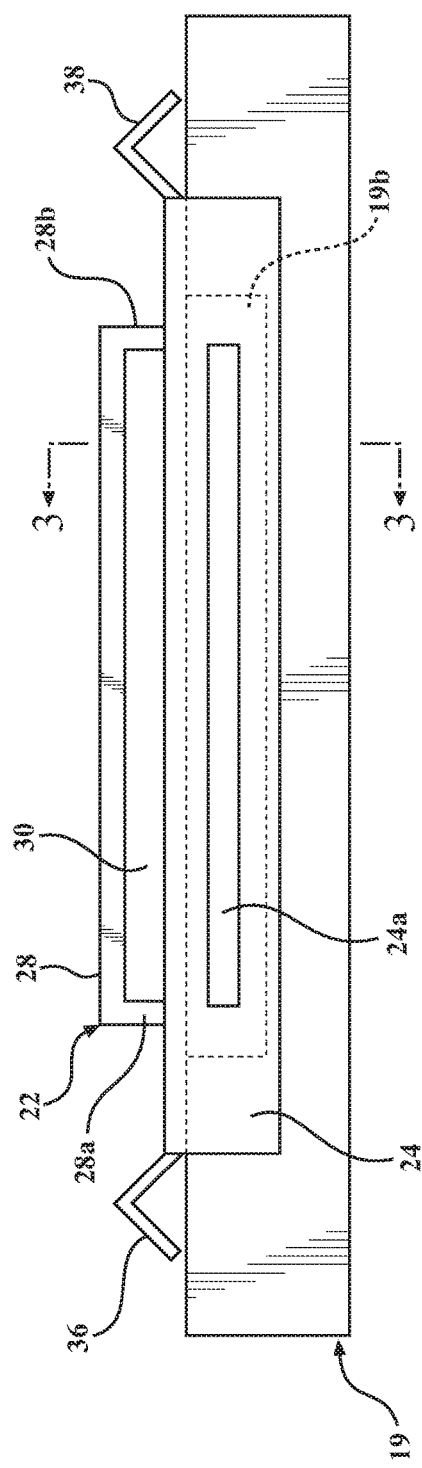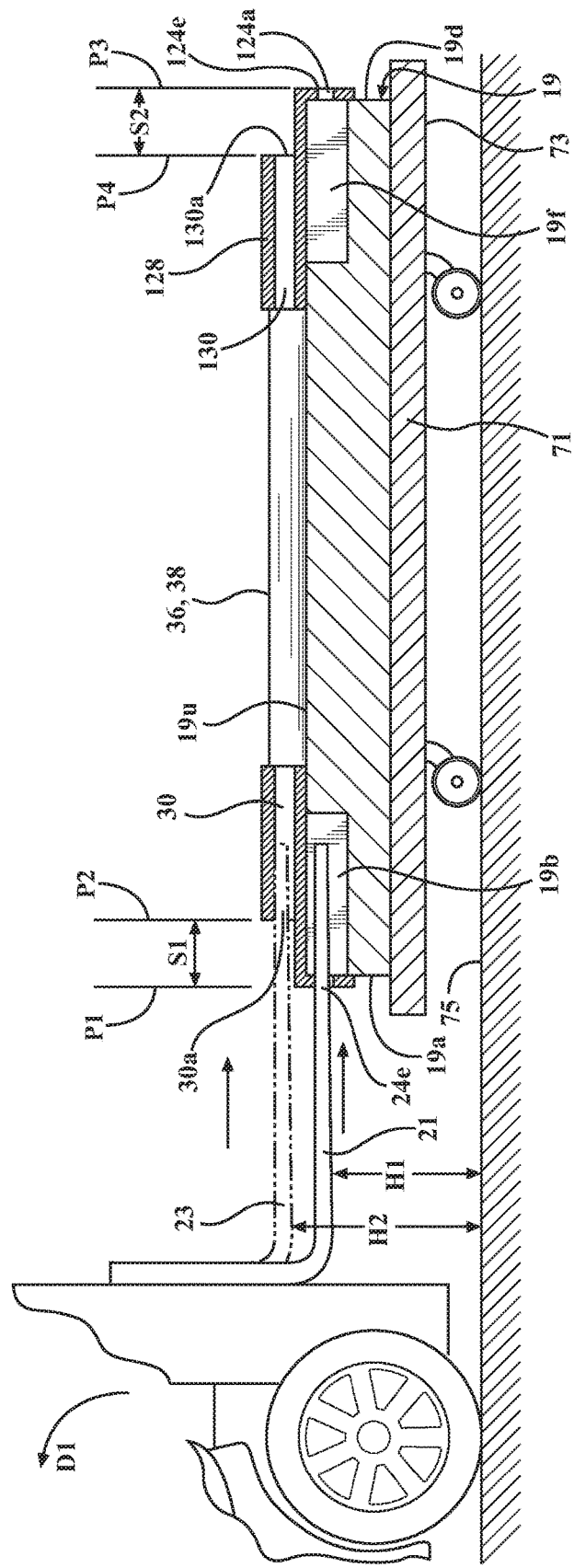

VEHICLE WEIGHING SCALE LIFTING BRACKET

TECHNICAL FIELD

The present invention relates to attachments to aid in lifting objects and, more particularly, to a lifting bracket to aid in moving and positioning of a vehicle weighing scale.

BACKGROUND

A portable vehicle weighing scale may be positioned below a wheel or tire of a vehicle suspended above a floor surface. The wheel may then be lowered onto the scale, to enable weighing of the portion of the vehicle residing on the wheel. This may be done with all of the vehicle wheels using multiple scales, to provide a total weight of the vehicle. Currently the vehicle weighing scales are transported on a cart that requires a person to bend over and manually lift the scales from the cart and position the scales. This method is physically tiresome, and manual positioning of the scale underneath the vehicle wheel could be dangerous if the suspended vehicle was to accidentally fall during this process.

SUMMARY

In one aspect of the embodiments described herein, a lifting bracket for a vehicle weighing scale is provided. The lifting bracket includes a first lifting portion having a first wall, a second wall extending from the first wall, and a third wall coupled to the second wall. The third wall extends opposite and spaced apart from the second wall.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 2 is a schematic end view of the lifting bracket embodiment shown in FIG. 1, showing the bracket coupled to a vehicle weighing scale.

FIG. 3 is a cross-sectional side view of the lifting bracket embodiment shown in FIGS. 1 and 2, also showing the bracket coupled to a vehicle weighing scale.

DETAILED DESCRIPTION

Figure 1:
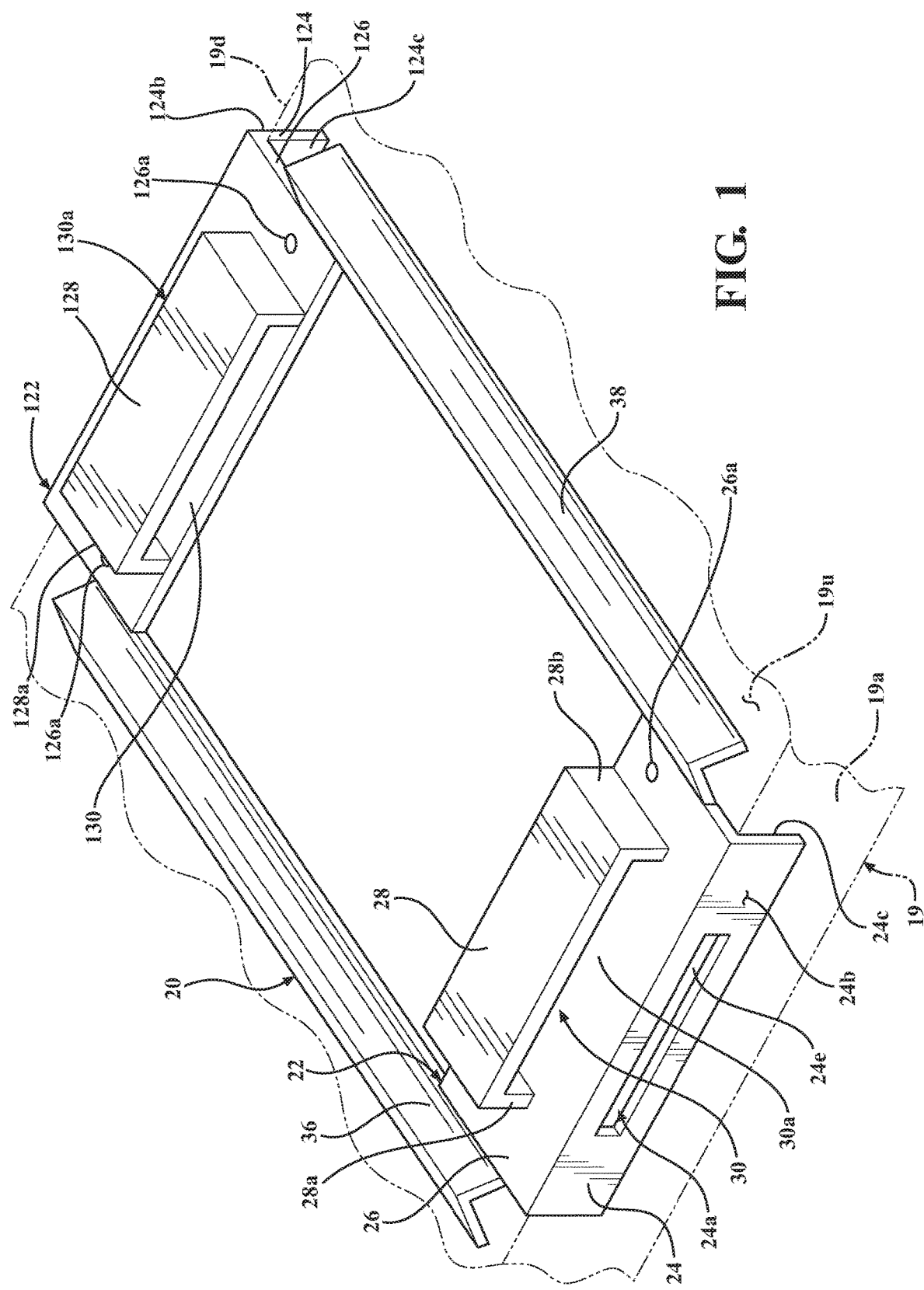
FIG. 1 is a schematic perspective view of a vehicle weighing scale lifting bracket in accordance with an embodiment described herein.

Embodiments described herein relate to a lifting bracket attachable to a vehicle weighing scale, to enable the scale to be conveniently moved and positioned using a hand truck. The lifting bracket may include a first lifting portion attachable to a first side of the vehicle weighing scale, to enable the scale to be lifted off of a weighing scale transport cart and moved to a desired location using a hand truck with a lifting tongue. The lifting tongue is positioned by a user to engage features on the lifting bracket, by which the scale may be moved from the transport cart and positioned on a floor surface under a suspended wheel of a vehicle. Tire blocking elements may be attached to the first lifting portion and may extend across an upper surface of the weighing scale when the first lifting portion is attached to the scale, to aid in locating/centering and maintaining a vehicle wheel on the scale. A second lifting portion may be attached to the tire blocking elements and to the scale along a second side of the scale opposite the first side of the scale. This may enable the scale to be lifted along either the first or second sides of the scale.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

Referring to the drawings, in one or more embodiments, a lifting bracket 20 for a vehicle weighing scale may include a first lifting portion 22. The first lifting portion 22 may include a first wall 24 and a second wall 26 extending from the first wall 24. In one or more arrangements, the second wall 26 may extend from the first wall 24 so as to form an included right angle. In one or more arrangements, the first and second walls 24 and 26 may be formed from a stock steel angle of suitable cross-sectional dimensions and cut to a desired length. In other arrangements, the first and second walls may be formed from suitably dimensioned steel plates joined at ends thereof by welding or any other suitable method.

The first wall 24 may include a through slot 24a formed therein. The through slot 24a may extend between a first face 24b of the first wall 24 and a second face 24c of the first wall 24 opposite the first face 24b. The first lifting portion 22 may be structured for attachment to a weighing scale 19 such that the first wall second face 24c is in contact with a first side 19a of the weighing scale 19 when the first lifting portion 22 is attached to the weighing scale 19. The through slot 24a may be dimensioned to receive a hand truck lifting tongue 21 therethrough and may be positioned along first wall 24 so as to guide the lifting tongue 21 into a recess 19b (FIGS. 2 and 3) formed in the vehicle weighing scale 19.

Second wall 26 may be structured to lie along an upper surface 19u of the weighting scale when the first lifting portion 22 is attached to the weighing scale 19. The second wall 26 may include bolt holes 26a enabling attachment of the first lifting portion 22 to the weighing scale upper surface 19u. The first lifting portion 22 may be structured for attachment to the weighing scale 19 such that the second wall 26 is in contact with the upper surface 19c of the weighing scale 19 when the first lifting portion 22 is attached to the weighing scale 19.

A third wall 28 may be coupled to the second wall 26. The third wall 28 may extend opposite and spaced apart from the second wall 26. In one or more arrangements, the third wall 28 may be attached to the second wall 26 by flanges 28a, 28b located at ends of the third wall 28. The third wall 28 and any associated attachment means (such as flanges 28a, 28b) may be structured so as to define a cavity 30 between the second wall 26 and the third wall 28 when the third wall 28 is coupled to the second wall 26. The cavity 30 may be structured so as to enable a hand truck lifting tongue 23 to be inserted therein, to enable lifting of the weighing scale 19 to which the lifting bracket 20 is attached.

As seen in FIG. 3, a first plane P1 including an entrance 24e to the slot 24a may be spaced apart a distance S1 from a second plane P2 extending parallel to the first plane P1 and including an entrance 30a to the cavity 30. The entrance 30a to the cavity 30 may be located along a side of the cavity where the lift truck tongue would be inserted in order to lift the weighing scale 19. Similarly, the entrance 24e to the slot 24a may be located along a side of the slot where the lift truck tongue would be inserted in order to lift the weighing scale 19. The spacing apart of the planes P1 and P2 enables a user to easily locate the cavity 30 for insertion of the lifting tongue 23 therein when the weighing scale 19 is to be lifted using the cavity 30 and the third wall 28 rather than by inserting the lifting tongue 21 through the slot 24a and into the recess 19b formed in the weighing scale 19 (for example, in cases where the weighing scale does not have a recess 19b formed therealong).

In one or more arrangements, a first tire blocking portion 36 may be coupled to the first lifting portion 22. A second tire blocking portion 38 may also be coupled to the first lifting portion 22. The second tire blocking portion 38 may extend opposite and spaced apart from the first tire blocking portion 36. In one or more arrangements, the tire blocking portions 36, 38 may be structured to extend above the upper surface 19u of the weighing scale 19 when the first lifting portion 22 is attached to the weighing scale 19. In embodiments where the tire blocking portions 36, 38 extend between and are attached to both a first lifting portion 22 and a second lifting portion 122 positioned opposite the first lifting portion 22 as described herein, the tire blocking portions 36, 38 may be supported above the weighing scale upper surface 19u when the first lifting portion 22 and second lifting portion 122 are attached to the weighing scale 19. In other arrangements, the tire blocking portions 36, 38 may be attached to the first lifting portion 22 so as to be in contact with the weighing scale upper surface 19u when the first lifting portion 22 is attached to the weighing scale 19.

When the first lifting portion 22 (and, optionally, a second lifting portion 122) are attached to the weighing scale 19, the spaced-apart tire blocking portions 36, 38 act as "bumps" projecting from the scale upper surface 19u to help position and retain a wheel (not shown) of a vehicle on a center portion of the weighing scale upper surface 19u. That is, the tire blocking portions 36, 38 act as impediments to the rolling of a vehicle wheel positioned between the spaced apart tire blocking portions 36, 38, to help position the vehicle wheel on the center portion of the scale 19. Each of the tire blocking portions 36, 38 may be formed from a stock steel angle or any other suitable element(s), and may be coupled to the first lifting portion 22 (and, optionally, to a second lifting portion 122) using welds or any other suitable attachment method.

In one or more embodiments, the lifting bracket 20 may further include a second lifting portion 122 coupled to the first tire blocking portion 36 and to the second tire blocking portion 38. The second lifting portion 122 may be positioned opposite and spaced apart from the first lifting portion 22. The second lifting portion 122 may be structured the same as the first lifting portion 22. More specifically, the second lifting portion 122 may include a fourth wall 124 (similar to first wall 24), a fifth wall 126 (similar to second wall 26) extending from the fourth wall 124, and a sixth wall 128 (similar to third wall 28) coupled to the fifth wall 126. The sixth 128 wall may extend opposite and be spaced apart from the fifth wall 126. The second lifting portion 122 may be attached to a second side 19d of the weighing scale opposite the first side 19a of the weighing scale. As shown in FIGS. 1 and 3, the second lifting portion 122 may be oriented and attached to the second side 19d of the weighing scale 19 in "mirror image' fashion with respect to the first lifting portion 22 positioned along scale first side 19a. The second lifting portion 122 may be coupled to the first and second tire blocking portions 36, 38 in the same manner as the first lifting portion 22 is coupled to the first and second tire blocking portions 36, 38.

In one or more arrangements, the fifth wall 126 may extend from the fourth wall 124 so as to form an included right angle. In one or more arrangements, the fourth and fifth walls 124, 126 may be formed from a stock steel angle of suitable cross-sectional dimensions and cut to a desired length. In other arrangements, the fourth and fifth walls 124, 126 may be formed from suitably dimensioned steel plates joined at ends thereof by welding or any other suitable method.

The fourth wall 124 may have a through slot 124a (FIG. 3) formed therein, similar to slot 24a. The through slot 124a may extend between a first face 124b of the fourth wall 124 and a second face 124c of the fourth wall 124 opposite the first face 124b. The second lifting portion 122 may be structured for attachment to the weighing scale 19 such that the fourth wall second face 124c is in contact with the second side 19d of the weighing scale opposite the first side 19a, when the second lifting portion 122 is attached to the weighing scale 19. The through slot 124a may be dimensioned to receive hand truck lifting tongue 21 therethrough and may be positioned along fourth wall 124 to guide the lifting tongue into a recess 19f formed in the vehicle weighing scale 19 along the second side 19d of the scale.

Fifth wall 126 may be structured to lie along the upper surface 19u of the weighting scale 19. The fifth wall 126 may include bolt holes 126a enabling attachment of the second lifting portion 122 to the weighing scale upper surface 19u. The second lifting portion 122 may be structured for attachment to the weighing scale 19 such that the fifth wall 126 is in contact with the upper side 19u of the weighing scale 19 when the second lifting portion 122 is attached to the weighing scale.

Sixth wall 128 may be coupled to the fifth wall 126. The sixth wall 128 may extend opposite and spaced apart from the fifth wall 126. In one or more arrangements, the sixth wall 128 may be attached to the fifth wall 126 by flanges 128a, 128b located at the ends of the sixth wall 128. The sixth wall 128 and any associated attachment means (such as flanges 128a, 128b) may be structured so as to define a cavity 130 between the fifth wall 126 and the sixth wall 128 when the sixth wall 128 is attached to the fifth wall 126. The cavity 130 may be structured so as to enable a hand truck lifting tongue 23 to be inserted therein, to enable lifting of the weighing scale 19 to which the second lifting bracket 122 is attached.

As seen in FIG. 3, a third plane P3 including an entrance 124e to the slot 124a may be spaced apart a distance S2 from a fourth plane P4 extending parallel to the third plane P3 and including an entrance 130a to the cavity 130. The entrance 130a to the cavity 130 is located along a side of the cavity 130 where the lift truck tongue would be inserted in order to lift the weighing scale 19. Similarly, the entrance 124e to the slot 124a is located along a side of the slot where the lift truck tongue would be inserted in order to lift the weighing scale 19. The spacing apart of the third and fourth planes P3 and P4 enables a user to easily locate the cavity 130 for insertion of the lifting tongue 23 therein when the weighing scale 19 is to be lifted using the cavity 130 and the sixth wall 128 rather than by inserting the lifting tongue 21 through the first wall slot 124a and into the recess 19f formed in the weighing scale 19 along the scale second side 19d.

In use, the first lifting portion 22 may be bolted or otherwise attached to the weighing scale 19 along the first side 19a of the scale as previously described. In embodiments of the lifting bracket incorporating a second lifting portion 122, the second lifting portion 122 may also be bolted or otherwise attached to the scale 19 along the second side 19d of the scale opposite the first side 19a. FIG. 3 shows a side cross-sectional view of an embodiment of the lifting bracket incorporating both a first lifting portion 22 and a second lifting portion 122. The weighing scale 19 is shown resting on a shelf 71 of a transport cart 73 which may be freely movable to any desired position on a floor surface 75. The transport cart shelf 71 may be structured to support the weighing scale 19 at a height above the floor such that a hand truck 77 may be rolled across the floor to horizontally insert a lifting tongue of the hand truck into either a slot 24a of the first wall 24 of a first lifting portion 22 of the lifting bracket, or into the cavity 30 formed between the second and third walls 26, 28 of the first lifting portion 22, as previously described.

To lift a weighing scale 19 which has a recess 19b formed along the first side thereof, a hand truck lifting tongue 21 residing at a height H1 above the floor surface 75 may be inserted into the slot 24a of the first wall 24. The hand truck may then be rotated in direction D1 so that the lifting tongue 21 contacts the first lifting portion second wall 26 inside the recess 19b, to lift the scale 19 off the shelf 71. The weighing scale 19 may then be transported by hand truck to a location adjacent a vehicle wheel (not shown) suspended above the floor surface 75, where the scale 19 may then be deposited in a desired position below the suspended vehicle wheel.

To lift a weighing scale which does not have recess 19b formed along the first side 19a of the scale, a hand truck lifting tongue 23 residing at a height H2 above the floor surface 75 may be inserted into the cavity 30 formed between the second wall 26 and the third wall 28. The hand truck may then be rotated in direction D1 so that the tongue 23 contacts the third wall 28 inside the cavity 30, thereby lifting the scale 19 off the shelf 71.

Because the second lifting portion 122 is attached to the scale 19 as a "mirror image" of the first lifting portion 22, the user may also lift the weighing scale 19 from the scale second side 19d with the second lifting portion 122 using the methods just described.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A lifting bracket for a vehicle weighing scale, the lifting bracket comprising:
a first lifting portion including a first wall, a second wall extending from the first wall, and a third wall coupled to the second wall, the third wall extending opposite and spaced apart from the second wall,
the second wall and the third wall defining a cavity therebetween, wherein a first plane extends along the first wall, wherein a second plane extends parallel to the first plane and includes an entrance to the cavity, and wherein the second plane is spaced apart from the first plane.

2. The lifting bracket of claim 1 further comprising a first tire blocking portion coupled to the first lifting portion, and a second tire blocking portion coupled to the first lifting portion and extending opposite and spaced apart from the first tire blocking portion.

3. The lifting bracket of claim 2 further comprising a second lifting portion coupled to the first tire blocking portion and to the second tire blocking portion, the second lifting portion being positioned opposite and spaced apart from the first lifting portion.

4. The lifting bracket of claim 3 wherein the second lifting portion includes a fourth wall, a fifth wall extending from the fourth wall, and a sixth wall coupled to the fifth wall, the sixth wall extending opposite and spaced apart from the fifth wall.

5. The lifting bracket of claim 4 wherein the fourth wall has a through slot formed therein.

6. The lifting bracket of claim 1, wherein the first wall has a through slot formed therein, and wherein the first plane includes an entrance to the slot.

7. An assembly comprising:
a vehicle weighing scale; and
a lifting bracket in accordance with claim 1 attached to the vehicle weighing scale.

* * * * *